US008751593B2

(12) United States Patent
Chuan et al.

(10) Patent No.: US 8,751,593 B2
(45) Date of Patent: Jun. 10, 2014

(54) SYSTEM AND METHOD FOR DYNAMIC THROTTLING DURING BULK MESSAGE DELIVERY

(75) Inventors: Tan Chuan Chuan, Jalan Membina (SG); Clarence Ng Ching Wah, Ang Mo Kio (SG)

(73) Assignee: Sybase 365, Inc., Reston, VA (US)

( * ) Notice: Subject to any disclaimer, the term of this patent is extended or adjusted under 35 U.S.C. 154(b) by 88 days.

(21) Appl. No.: 13/432,269

(22) Filed: Mar. 28, 2012

(65) Prior Publication Data

US 2012/0254331 A1    Oct. 4, 2012

Related U.S. Application Data

(60) Provisional application No. 61/469,296, filed on Mar. 30, 2011.

(51) Int. Cl.
G06F 15/16 (2006.01)
(52) U.S. Cl.
USPC .......................................... 709/206; 709/207
(58) Field of Classification Search
USPC ................... 709/206, 207; 370/401
See application file for complete search history.

(56) References Cited

U.S. PATENT DOCUMENTS

| 4,766,604 | A | 8/1988 | Axberg | |
|---|---|---|---|---|
| 7,154,901 | B2 * | 12/2006 | Chava et al. | 370/401 |
| 7,702,739 | B1 * | 4/2010 | Cheng et al. | 709/207 |
| 7,876,766 | B1 * | 1/2011 | Atkins et al. | 370/401 |

OTHER PUBLICATIONS

International Search Report and the Written Opinion, PCT/US2012/030827, Jul. 5, 2012, 7 pages.

* cited by examiner

*Primary Examiner* — Liangche A Wang
*Assistant Examiner* — Cheikh Ndiaye
(74) *Attorney, Agent, or Firm* — Kenyon & Kenyon LLP

(57) ABSTRACT

An flexible, extensible, and dynamically configurable intelligent throttling capability that among other things can support the bulk processing of a wide range of information (including inter alia Short Message Service, Multimedia Message Service, IP Multimedia Subsystem, etc. messages; E-Mail messages; Instant Messaging communications; Session Initiation Protocol-addressed artifacts; signaling, command-and-control, application, etc. data; etc.) that may result following for example service interruptions, system outages, bursts of traffic (for example in response to a tele-voting initiative, from a mass broadcast of alert or information messages in response to a news item or an emergency situation, etc.), equipment failures, etc.

12 Claims, 19 Drawing Sheets

1100

| Segment | Number of Messages |
|---------|--------------------|
| 1 | 435 |
| 2 | 435 |
| 3 | 435 |
| 4 | 435 |
| Total | 1740 |

| Segment | Number of Messages |
|---------|--------------------|
| 1 | 290 |
| 2 | 290 |
| 3 | 290 |
| 4 | 290 |
| 5 | 290 |
| 6 | 290 |
| Total | 1740 |

| Segment | Number of Messages |
|---|---|
| 1 | 265 |
| 2 | 415 |
| 3 | 390 |
| 4 | 150 |
| Total | 1220 |

| Segment | Number of Messages |
|---|---|
| 1 | 163 |
| 2 | 235 |
| 3 | 143 |
| 4 | 216 |
| 5 | 92 |
| 6 | 170 |
| 7 | 201 |
| Total | 1220 |

FIG. 12b

```
ProcessPool
{
    /* Perform any initialization activities */
    Initialize ();

/* Process each segment in the message pool */
    for (segmentNo = 1; segmentNo <= messagePool.noOfSegments; segmentNo ++)
    {
        /* Process each message in segment segmentNo */
        for (messageNo = 1; messageNo <= messagePool.segment [segmentNo].noOfMessages; messageNo ++)
        {
            /* Send message messageNo in segment segmentNo */
            send message messagePool.segment [segmentNo].message [messageNo].message;

/* Optionally wait for and optionally process message send ACK */

/* Wait (after message is sent) */
            pause (time1);
        }

/* Wait (after segment is done) */
        pause (time2);
    }

/* Perform any cleanup activities */
    Finalize ();
}
```

FIG. 15

```
ProcessPool
{
    /* Perform any initialization activities */
    Initialize ();

/* Spin through all of the segments in the message pool */
    for (segmentNo = 1; segmentNo <= messagePool.noOfSegments; segmentNo ++)
    {
        /* A segment starts out as closed with no messages sent */
        messagePool.segment [segmentNo].status = CLOSED;
        messagePool.segment [segmentNo].noOfMessagesSent = 0;
        for (messageNo = 1; messageNo <= messagePool.segment [segmentNo].noOfMessages;
             messageNo ++)
            messagePool.segment [segmentNo].message [messageNo].status = UNSENT;
    }

/* Start processing */
    notDone = TRUE;
    noOfChildThreads = 0;
    while (notDone)
    {
        /* Is the window closed? */
        if (window.status == CLOSED)
        {
            /* Yes, stop any sending activity ... */
            for (segmentNo = 1; segmentNo <= messagePool.noOfSegments; segmentNo ++)
                if (messagePool.segment [segmentNo].status == WORKING)
                {
                    Cleanly terminate child thread with ProcessSegment (segmentNo);
                    noOfChildThreads --;
                    messagePool.segment [segmentNo].status = CLOSED;
                }

/* ... and loop (wait for the window to open) */
            continue;
        }
```

Continued from Figure 16a

```
/* The window is open.  Any segments with unsent messages that are not */
/* currently being worked? */
for (segmentNo = 1; segmentNo <= messagePool.noOfSegments; segmentNo ++)
if (messagePool.segment[segmentNo].status == CLOSED)
{
    /* Yes, can we launch another child thread? */
    if (noOfChildThreads < maxNoOfChildThreads)
    {
        /* Yes, start working this segment */
        messagePool.segment[segmentNo].status = WORKING;
        launch child thread with ProcessSegment (segmentNo);
        noOfChildThreads ++;
    }
}

/* Has a segment that is currently being worked sent all of its messages? */
for (segmentNo = 1; segmentNo <= messagePool.noOfSegments; segmentNo ++)
if (messagePool.segment[segmentNo].status == WORKED)
{
    /* Yes, mark the segment as done */
    messagePool.segment[segmentNo].status = DONE;
    Cleanly terminate child thread with ProcessSegment (segmentNo);
    noOfChildThreads --;
}
```

Continued from Figure 16b

```
/* Has a segment that is currently being worked reached a messages-sent */
/* threshold such that we can now open another segment? */
foundSegment = FALSE;
for (segmentNo = 1; segmentNo <= messagePool.noOfSegments; segmentNo ++)
    if (messagePool.segment [segmentNo].status == WORKING)
    {
        if ( (messagePool.segment [segmentNo].noOfMessagesSent /
              messagePool.segment [segmentNo].noOfMessages) >= messagesSentThreshold)
        {
            /* Yes, start working another segment */
            for (segmentNo = 1; segmentNo <= messagePool.noOfSegments; segmentNo ++)
                if (messagePool.segment [segmentNo].status == CLOSED)
                {
                    messagePool.segment [segmentNo].status = WORKING;
                    launch child thread with ProcessSegment (segmentNo);
                    noOfChildThreads ++;

foundSegment = TRUE;
                    break;
                }
        }
    } if (foundSegment == TRUE)
    break;
}

/* Are we all done? */
noOfSegmentsDone = 0;
for (segmentNo = 1; segmentNo <= messagePool.noOfSegments; segmentNo ++)
    if (messagePool.segment [segmentNo].status == DONE)
        noOfSegmentsDone ++;
if (noOfSegmentsDone == messagePool.noOfSegments)
{
    /* Yes */
    notDone = FALSE;
}
```

Continued from Figure 16c

```
    pause (time5);
}
/* Perform any cleanup activities */
Finalize ();
}
ProcessSegment (segmentNo)
{
    /* Process each message in segment segmentNo */
    for (messageNo = 1; messageNo <= messagePool.segment (segmentNo).noOfMessages; messageNo ++)
    {
        /* Send message messageNo in segment segmentNo */
        send message messagePool.segment [segmentNo].message [messageNo].message;

/* Optionally wait for and optionally process message send ACK */ messagePool.segment [segmentNo].message [messageNo].status = SENT;
        messagePool.segment [segmentNo].noOfMessagesSent ++;

/* Wait (after message is sent) */
        pause (time3);
    }
    messagePool.segment [segmentNo].status = WORKED;
    /* Wait (after segment is done */
    pause (time4);

/* Exit */
}
```

FIG. 16d

SYSTEM AND METHOD FOR DYNAMIC THROTTLING DURING BULK MESSAGE DELIVERY

This patent application claims the benefit of U.S. Provisional Patent Application Ser. No. 61/469,296, filed on 30 Mar. 2011, which is herein incorporated by reference in its entirety.

BACKGROUND

1. Field of the Invention

The present invention relates generally to telecommunications services. More particularly, the present invention relates to capabilities that enhance substantially the value and usefulness of various communication paradigms including, inter alia, Short Message Service (SMS), Multimedia Message Service (MMS), Unstructured Supplementary Service Data (USSD), Internet Protocol (IP) Multimedia Subsystem (IMS), Wireless Application Protocol (WAP), Session Initiation Protocol [SIP]—addressed communications, Electronic Mail (E-Mail), Instant Messaging (IM), etc.

2. Background of the Invention

As the 'wireless revolution' continues to march forward through various flavors of 2G, 3G, 4G, and beyond, the importance to a Mobile Subscriber (MS)—for example a user of a Wireless Device (WD) that is serviced by possibly inter alia a Wireless Carrier (WC)—of their WD grows substantially. Examples of WDs include, inter alia, mobile telephones, handheld computers, Internet-enabled phones, pagers, radios, TVs, audio devices, car (audio, navigation, etc.) systems, recorders, text-to-speech devices, bar-code scanners, net appliances, mini-browsers, Personal Data Assistants (PDAs), etc.

One consequence of such a growing importance is the resulting ubiquitous nature of WDs—i.e., MSs have them available at almost all times and use them for an ever-increasing range of activities. For example, MSs employ their WDs to, possibly inter alia:

1) Exchange (e.g., SMS, MMS, etc.) messages, content (such as inter alia pictures and other static images; songs and other quanta of audio data; movies, streaming video, and other quanta of video data; data from software applications such as games), etc. with other MSs (e.g., "Let's meet for dinner at 6", etc.) through Peer-to-Peer, or P2P, messaging.

2) Secure information (such as, for example, weather updates, travel alerts, news updates, sports scores, stock updates, etc.), participate in voting initiatives (such as, for example, with the television show American Idol®), exchange content (such as for example pictures and other static images; songs and other quanta of audio data; movies, streaming video, and other quanta of video data; games and other software applications; etc.), interact with social networking sites, etc. through various of the available Application-to-Peer, or A2P, based service offerings.

3) Engage in Mobile Commerce (which, broadly speaking, encompasses the buying and selling of products, goods, services, etc. through a WD) and Mobile Banking (which, broadly speaking, encompasses performing various banking activities through a WD).

The ubiquitous nature of WDs has among other things resulted in very high volumes of data traffic. As just one example, around the world during 2009 there were over five trillion SMS messages exchanged and in North America during just the first half of 2010 over one trillion SMS messages were exchanged.

Under normal circumstances all of the traffic flows through the mobile ecosystem without issue. However, perturbations do arise. For example, service interruptions, system outages, bursts of traffic (for example in response to a tele-voting initiative, from a mass broadcast of alert or information messages in response to a news item or an emergency situation, etc.), equipment failures, etc. can all result in a 'pool' of traffic (including inter alia SMS, MMS, IMS, etc. messages; SIP-addressed artifacts; application data; WAP-based exchanges; E-Mail messages; signaling, command-and-control, application, etc. data; IM messages; etc.) that needs to be bulk processed.

It would be desirable to have a way of efficiently managing such a pool of traffic, including inter alia a way of dynamically throttling the sending of the traffic in the pool, so as to among other things maximize a WD user's experience.

Aspects of the present invention fill the lacuna that was noted above by (1) providing (within inter alia a Messaging Inter-Carrier Vendor [MICV]) an intelligent dynamic throttling capability that can accommodate a wide range of information (including inter alia SMS, MMS, IMS, etc. messages; SIP-addressed artifacts; application data; WAP-based exchanges; E-Mail messages; signaling, command-and-control, application, etc. data; IM messages; etc.) while (2) addressing, in new and innovatory ways, various of the not insubstantial challenges that are associated with same.

SUMMARY OF THE INVENTION

In one embodiment of the present invention there is provided a server-based method for dynamic message throttling that can possibly among other things (1) identify a message pool to be processed (where the message pool comprises a plurality of messages), (2) partition the message pool into a plurality of subdivisions, and (3) while a delivery window is open perform a plurality of processing steps, including (a) opening a subdivision for processing (yielding an open subdivision), (b) selecting a message from the open subdivision (yielding a selected message), (c) performing one or more processing steps on the selected message, (d) dispatching through a gateway aspects of the selected message for subsequent delivery to a message recipient, and (e) pausing zero or more units of time.

In another embodiment of the present invention there is provided a processor-based system on a server for dynamic message throttling that includes possibly among other things (1) workflow modules configured to perform a plurality of processing steps, including at least (a) identifying a message pool to be processed (where the message pool comprising a plurality of messages), (b) partitioning the message pool into a plurality of subdivisions, and (c) performing one or more processing steps while a delivery window is open, including at least (i) opening a subdivision for processing (yielding an open subdivision), (ii) selecting a message from the open subdivision (yielding a selected message), (iii) performing a plurality of processing steps on the selected message, and (iv) pausing zero or more units of time, (2) a gateway configured to dispatch aspects of the selected message for subsequent delivery to a message recipient, (3) a repository configured to preserve aspects of the results of the plurality of processing steps, and (4) an administrator.

These and other features of the embodiments of the present invention, along with their attendant advantages, will be more fully appreciated upon a reading of the following detailed description in conjunction with the associated drawings.

BRIEF DESCRIPTION OF THE DRAWINGS

The accompanying drawings, which are incorporated herein and form part of the specification, depict embodiments of the present invention and, together with the summary that was presented above and the description that may be found below, further serve to illustrate inter alia the principles, structure, and operation of such embodiments. It will be readily apparent to one of ordinary skill in the relevant art that numerous variations, modifications, alternative forms, etc. of the depicted embodiments are easily possible and indeed are within the scope of the present invention.

FIGS. 11a and 11b illustrate hypothetical uniform message distributions.

FIGS. 12a and 12b illustrate hypothetical random message distributions.

FIG. 15 illustrates, through a stylized pseudo code, portions of a simplified message processing algorithm that is possible under aspects of the present invention.

FIGS. 16a through 16d illustrate, through a stylized pseudo code, portions of a message processing algorithm that is possible under aspects of the present invention.

Figure 1:
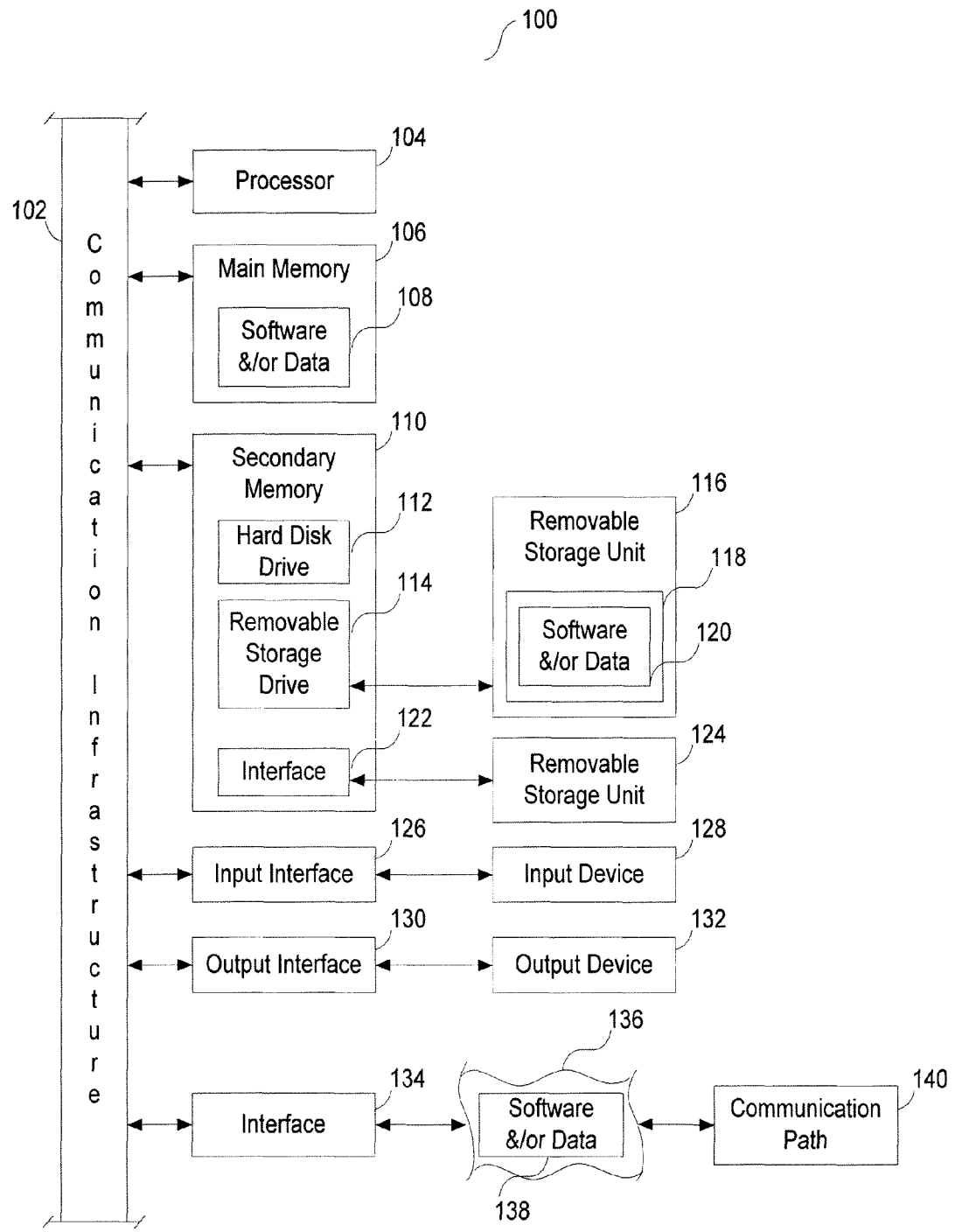
FIG. 1 depicts an exemplary computer system through which embodiments of aspects of the present invention may be implemented.

Throughout the drawings (a) like reference numbers generally indicate identical or functionally similar elements and (b) the left-most digit(s) of a reference number generally identify the drawing in which the reference number first appears. For example, in FIG. 3 reference numeral 220 would direct the reader to FIG. 2 for the first appearance of that element.

DETAILED DESCRIPTION OF THE INVENTION

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

Embodiments of the present invention are described herein in the context of a method and apparatus for dynamic throttling. Those of ordinary skill in the relevant art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Various aspects of the present invention may be implemented by software, firmware, hardware, or any combination thereof. FIG. 1 illustrates an example computer system 100 in which the present invention or portions thereof can be implemented as computer-readable code. Various embodiments of the invention are described in terms of this example computer system 100. After reading this description, it will become apparent to a person skilled in the relevant art how to implement the invention using other computer systems and/or computer architectures.

Computer system 100 includes one or more processors, such as processor 104. Processor 104 can be a special purpose processor or a general purpose processor. Processor 104 is connected to a communication infrastructure 102 (for example, a bus or a network).

Computer system 100 also includes a main memory 106, preferably Random Access Memory (RAM), containing possibly inter alia computer software and/or data 108.

Computer system 100 may also include a secondary memory 110. Secondary memory 110 may include, for example, a hard disk drive 112, a removable storage drive 114, a memory stick, etc. A removable storage drive 114 may comprise a floppy disk drive, a magnetic tape drive, an optical disk drive, a flash memory, or the like. A removable storage drive 114 reads from and/or writes to a removable storage unit 116 in a well known manner. A removable storage unit 116 may comprise a floppy disk, magnetic tape, optical disk, etc. which is read by and written to by removable storage drive 114. As will be appreciated by persons skilled in the relevant art(s) removable storage unit 116 includes a computer usable storage medium 118 having stored therein possibly inter alia computer software and/or data 120.

In alternative implementations, secondary memory 110 may include other similar means for allowing computer programs or other instructions to be loaded into computer system 100. Such means may include, for example, a removable storage unit 124 and an interface 122. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 124 and interfaces 122 which allow software and data to be transferred from the removable storage unit 124 to computer system 100.

Computer system 100 may also include an input interface 126 and a range of input devices 128 such as, possibly inter alia, a keyboard, a mouse, etc.

Computer system 100 may also include an output interface 130 and a range of output devices 132 such as, possibly inter alia, a display, one or more speakers, etc.

Computer system 100 may also include a communications interface 134. Communications interface 134 allows software and/or data 138 to be transferred between computer system 100 and external devices. Communications interface 134 may include a modem, a network interface (such as an Ethernet card), a communications port, a Personal Computer Memory Card International Association (PCMCIA) slot and card, or the like. Software and/or data 138 transferred via communications interface 134 are in the form of signals 136 which may be electronic, electromagnetic, optical, or other signals capable of being received by communications interface 134. These signals 136 are provided to communications interface 134 via a communications path 140. Communications path 140 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 116, removable storage unit 124, and a hard disk installed in hard disk drive 112. Signals carried over communications path 140 can also embody the logic described herein. Computer program medium and computer usable medium can also refer to memories, such as main memory 106 and secondary memory 110, which can be memory semiconductors (e.g. Dynamic Random Access Memory [DRAM] elements, etc.). These computer program products are means for providing software to computer system 100.

Computer programs (also called computer control logic) are stored in main memory 106 and/or secondary memory 110. Computer programs may also be received via communications interface 134. Such computer programs, when executed, enable computer system 100 to implement the present invention as discussed herein. In particular, the computer programs, when executed, enable processor 104 to implement the processes of aspects of the present invention, such as for example the steps discussed below. Accordingly, such computer programs represent controllers of the computer system 100. Where the invention is implemented using software, the software may be stored in a computer program product and loaded into computer system 100 using removable storage drive 114, interface 122, hard drive 112 or communications interface 134.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

In the discussion below aspects of the present invention are described and illustrated as residing within a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a discussion of the concept of a MICV, a summary of various of the services/functions/etc. that may be performed by a MICV, and a discussion of the numerous advantages that may arise from same.

While portions of the discussion below will for clarity of exposition reference a MICV, it will be readily apparent to one of ordinary skill in the relevant art that numerous other arrangements are equally possible and indeed are fully within the scope of the present invention. For example, aspects of the present invention may be realized through any combination of, possibly inter alia, any one or more of (1) an element of a WC, an element of a landline carrier, an element of a MICV, or multiple such elements working together; (2) a Third-Party (3P) such as possibly inter alia a Content Provider (CP, such as for example a news organization, an advertising agency, a brand, etc.) or a Service Provider (SP, such as for example a X); (3) multiple 3P entities working together; (4) a 3P service bureau; etc.

Figure 2:
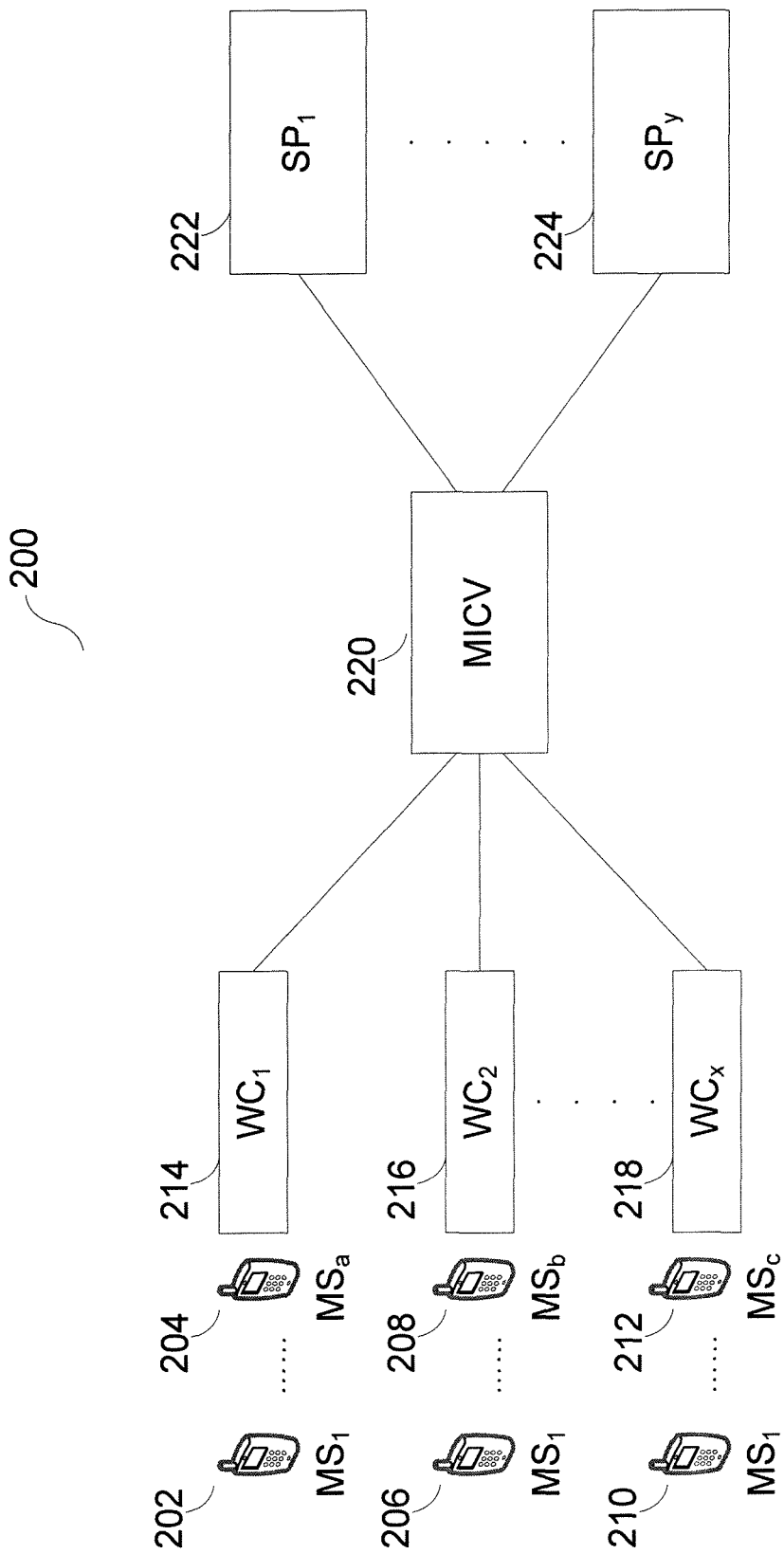
FIG. 2 is a diagrammatic presentation of an exemplary MICV.

As illustrated in FIG. 2 and reference numeral 200, under one particular arrangement of aspects of the present invention a MICV 220 may be disposed between, possibly inter alia, multiple WCs (WC$_1$ 214, WC$_2$ 216→WC$_x$ 218) and multiple SPs (SP$_1$ 222→SP$_y$ 224) and thus 'bridges' all of the connected entities. A MICV 220 thus, as one simple example, may offer various routing, formatting, delivery, value-add, etc. capabilities that provide, possibly inter alia:

1) A WC 214→218 (and, by extension, all of the MSs MS$_1$ 202→MS$_a$ 204, MS$_1$ 206→MS$_b$ 208, MS$_1$ 210→MS$_c$ 212 that are serviced by the WC 214→218) with ubiquitous access to a broad universe of SPs 222→224 (and other entities that nay be connected to the MICV), and 2) A SP 222→224 (and other entities that may be connected to the MICV) with ubiquitous access to a broad universe of WCs 214→218 (and, by extension, to all of the MSs MS$_1$ 202→MS$_a$ 204, MS$_1$ 206→MS$_b$ 208, MS$_1$ 210 MS$_c$ 212 that are serviced by the WCs 214→218).

Generally speaking a MICV may have varying degrees of visibility (e.g., access, etc.) to the (MS←→MS, MS←→SP, etc.) messaging traffic:

1) A WC may elect to route just their out-of-network messaging, signaling, data, etc. traffic to a MICV. Under this approach the MICV would have visibility (e.g., access, etc.) to just the portion of the WC's traffic that was directed to the MICV by the WC.

2) A WC may elect to route all of their messaging, signaling, data, etc. traffic to a MICV. The MICV may, possibly among other things, subsequently return to the WC that portion of the traffic that belongs to (i.e., that is destined for a MS of) the WC. Under this approach the MICV would have visibility (e.g., access, etc.) to all of the WC's traffic.

Figure 3:
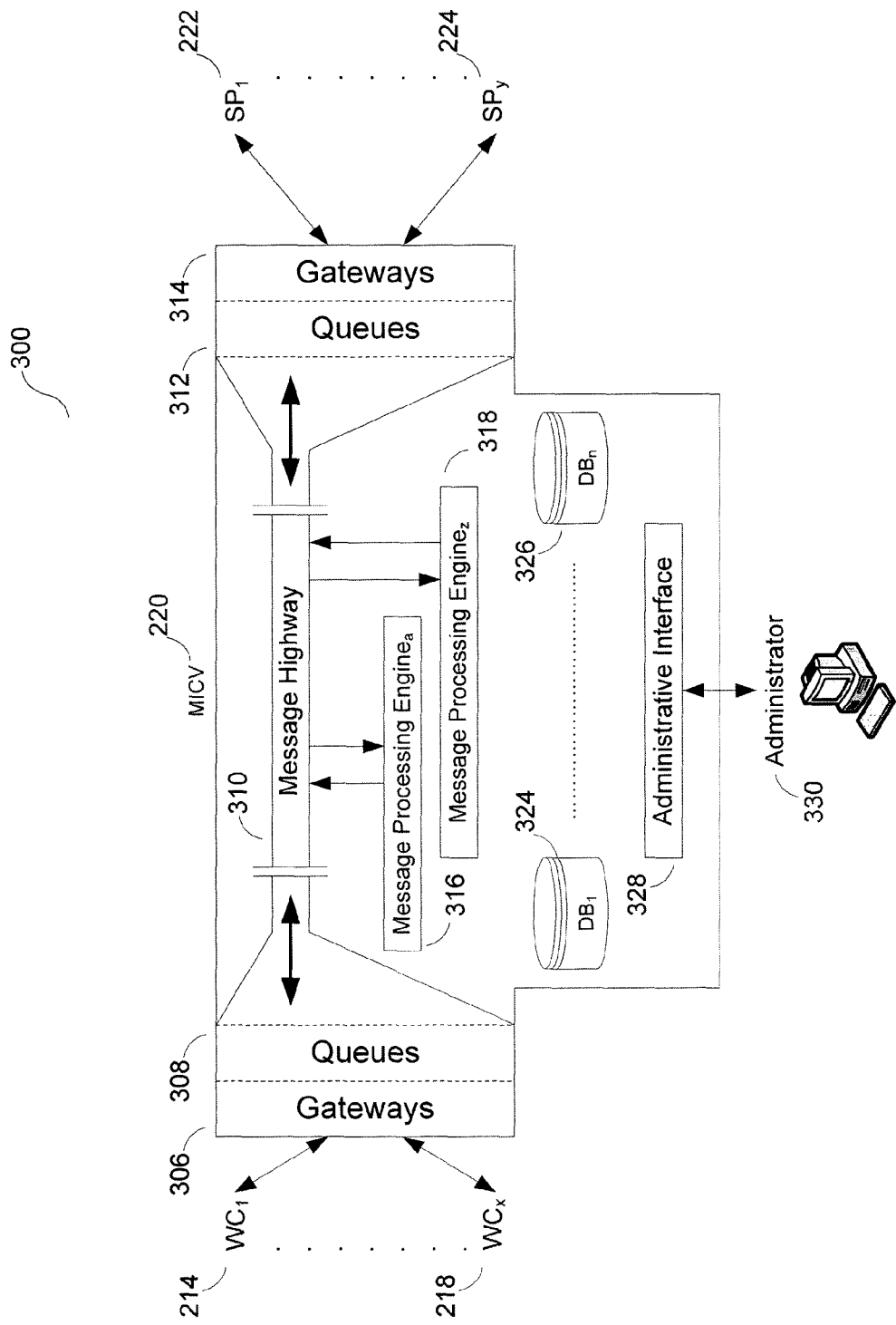
FIG. 3 illustrates various implementation aspects of an exemplary MICV.

For purposes of illustration, FIG. 3 and reference numeral 300 depict one specific logical implementation of aspects of a MICV 220 that is possible under one particular arrangement of aspects of the present invention. FIG. 3 and reference numeral 300 depict among other things Gateways (306 and 314 that for example provide inter alia information/data receipt and dispatch capabilities across among other things different application-level and/or physical-level communication protocols), Queues (308 and 312 that for example provide inter alia interim storage and buffering capabilities), and a Message Highway (MH 310 that for example provides inter alia interconnection capabilities).

FIG. 3 and reference numeral 300 also depict several Message Processing Engines (MPEs 316→318 that for example carry out inter alia various message processing activities).

Figure 4:
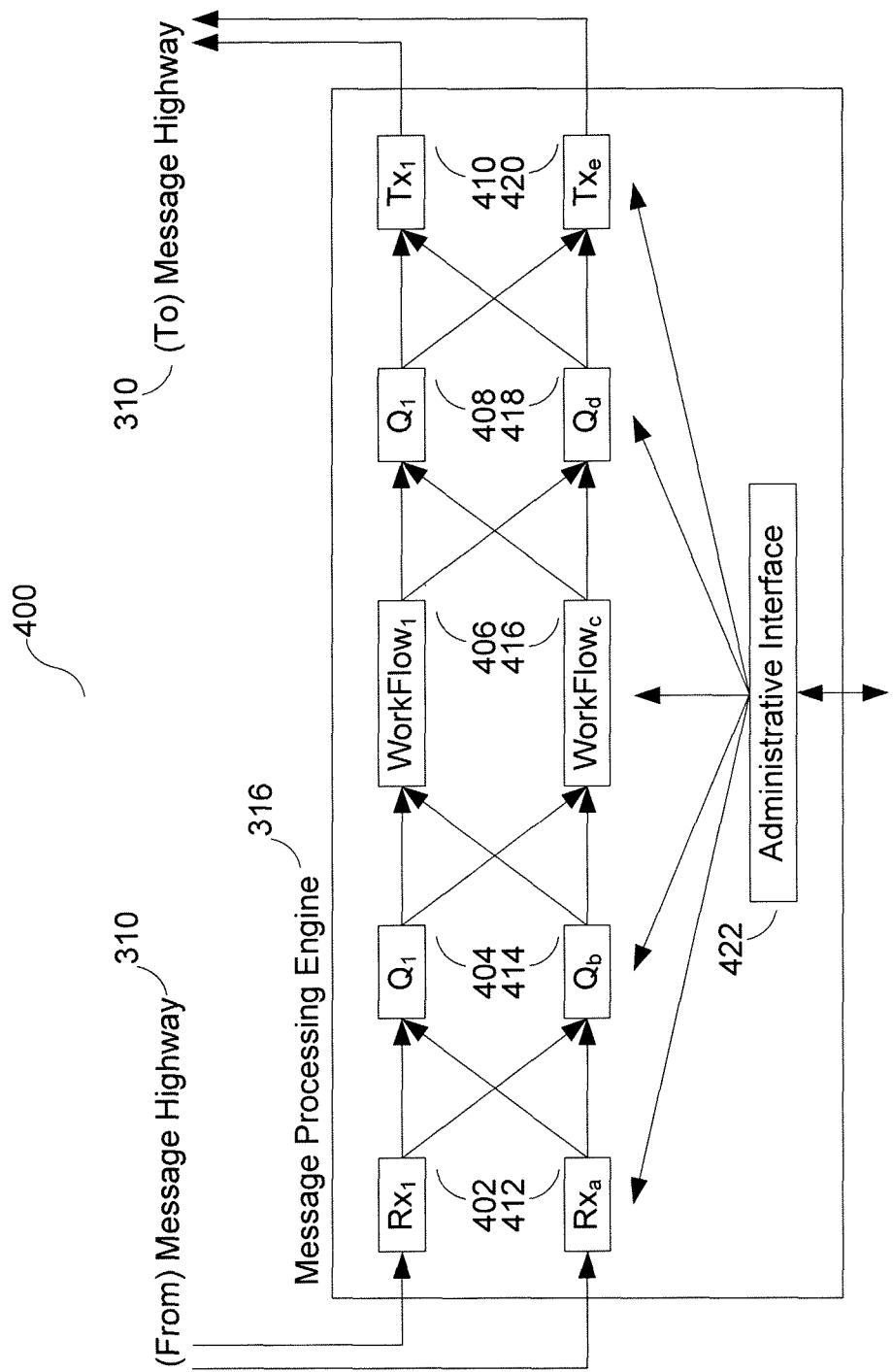
FIG. 4 further illustrates various implementation aspects of an exemplary MICV.

FIG. 4 and reference numeral 400 depict one particular logical implementation of aspects of a MPE 316 that is possible under aspects of the present invention. As illustrated by FIG. 4 and reference numeral 400 a MPE may comprise Receivers ($Rx_1$ 402→$Rx_a$ 412 in the diagram), Queues ($Q_1$ 404→$Q_b$ 414 and $Q_1$ 408→$Q_d$ 418 in the diagram), WorkFlows (WorkFlow$_1$ 406→WorkFlow$_c$ 416 in the diagram), Transmitters ($Tx_1$ 410→$Tx_e$ 420 in the diagram), and an Administrative Interface 422. It will be readily apparent to one of ordinary skill in the relevant art that numerous other components are possible within a MPE.

A dynamically updateable set of one or more Receivers ($Rx_1$ 402→$Rx_a$ 412 in the diagram) 'get' input (e.g., messages) from a MICV 220 MH 310 and possibly inter alia deposit them on an intermediate or temporary Queue ($Q_1$ 404→$Q_b$ 414 in the diagram) for subsequent processing.

A dynamically updateable set of one or more Queues ($Q_1$ 404→$Q_b$ 414 and $Q_1$ 408→$Q_d$ 418 in the diagram) operate as intermediate or temporary buffers for incoming and outgoing data (e.g., messages).

A dynamically updateable set of one or more WorkFlows (WorkFlow$_1$ 406→WorkFlow$_c$ 416 in the diagram) possibly inter alia (a) remove incoming messages from an intermediate or temporary Queue ($Q_1$ 404→$Q_b$ 414 in the diagram), (b) perform all of the required operations on the messages (more about this below), and (c) deposit the processed messages on an intermediate or temporary Queue ($Q_1$ 408→$Q_d$ 418 in the diagram).

A dynamically updateable set of one or more Transmitters ($Tx_1$ 410→$Tx_e$ 420 in the diagram) possibly inter alia remove processed messages from an intermediate or temporary Queue ($Q_1$ 408→$Q_d$ 418 in the diagram) and 'put' the messages on a MICV 220 MH 310.

An Administrative Interface 422 provides a linkage to all of the different components of a MPE so that a MPE, along with each of the components of a MPE, may be fully and completely administered or managed.

FIG. 3 and reference numeral 300 also depict several repositories ($DB_1$ 324→$DB_n$ 326) into which inter alia selected details of all administrative, analytical, processing, routing, logging, monitoring, etc. activities; Transaction Detail Records (TDRs); the results of Extraction-Transformation-Load (ETL) operations; configuration, profile, etc. information; etc. may be recorded. Among other things, such repositories may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a World Wide Web (WWW)-based facility; etc.

It is important to note that the depicted repositories $DB_1$ 324→$DB_n$ 326 are a logical representation of the possibly multiple physical repositories. The physical repositories may be implemented through any combination of conventional Relational Database Management Systems (RDBMSs), through Object Database Management Systems (ODBMSs), through in-memory Database Management Systems (DBMSs), or through any other equivalent facilities.

FIG. 3 and reference numeral 300 also depict an Administrative Interface 328 that inter alia provides management or administrative control over all of the different components of a MICV 220 environment through, as one example, a WWW-based facility 330. It will be readily apparent to one of ordinary skill in the relevant art that numerous other facilities (e.g., a data feed, an Application Programming Interface [API], etc.) are easily possible.

It is important to note that FIGS. 3 and 4 depict illustrative logical implementations. It will be readily apparent to one of ordinary skill in the relevant art that numerous other components, component arrangements, etc. are easily possible and, indeed, are fully within the scope of the present invention.

For simplicity FIG. 3 and FIG. 4 identify various components as for example 'Message Highway' and 'Message Processing Engine.' It is important to note that such components are not limited to operating on, processing, handling, etc. just (e.g., SMS, MMS, IMS, etc.) messages. Rather, as explained in detail below, all of the various MICV components are natively capable of operating on, processing, handling, etc. a more general quanta of data.

Central to the operation of a MICV is the unit of information within a MICV that is received, manipulated or otherwise operated on, dispatched, etc. Unlike prior environments that might operate just on, and thus potentially be limited just to, an SMS message or a MMS message, the unit of information within a MICV is a more general quanta of data. Accordingly a MICV is natively capable of operating on inter alia an SMS message, a MMS message, an IMS message, an E-Mail message, a Voice Over IP (VoIP) data stream, a video data stream (e.g., a movie, a video conference call, etc.), a voice telephone call, signaling and other command-and-control data, an audio data stream (e.g., a song, etc.), a SIP-addressed artifact, IM data, games and other software applications, pictures and other static images, data from software applications such as games, etc.

Within a MICV a flexible, extensible, and dynamically configurable IMO (see for example FIG. 7 and reference numeral 700, FIG. 8 and reference numeral 800, and FIG. 9 and reference numeral 900) may be employed as an internal representation of a received quanta of data. An IMO (702, 802, and 902) may logically contain possibly inter alia one or more headers (704 and 804), a body (706 and 806), etc. within which for example aspects of a received quanta of data may be preserved. An IMO may physically be realized through any combination of possibly inter alia proprietary data structures, Java Message Service (JMS) messages or objects, flat files, database entries, in-memory constructs, etc.

Figure 5:
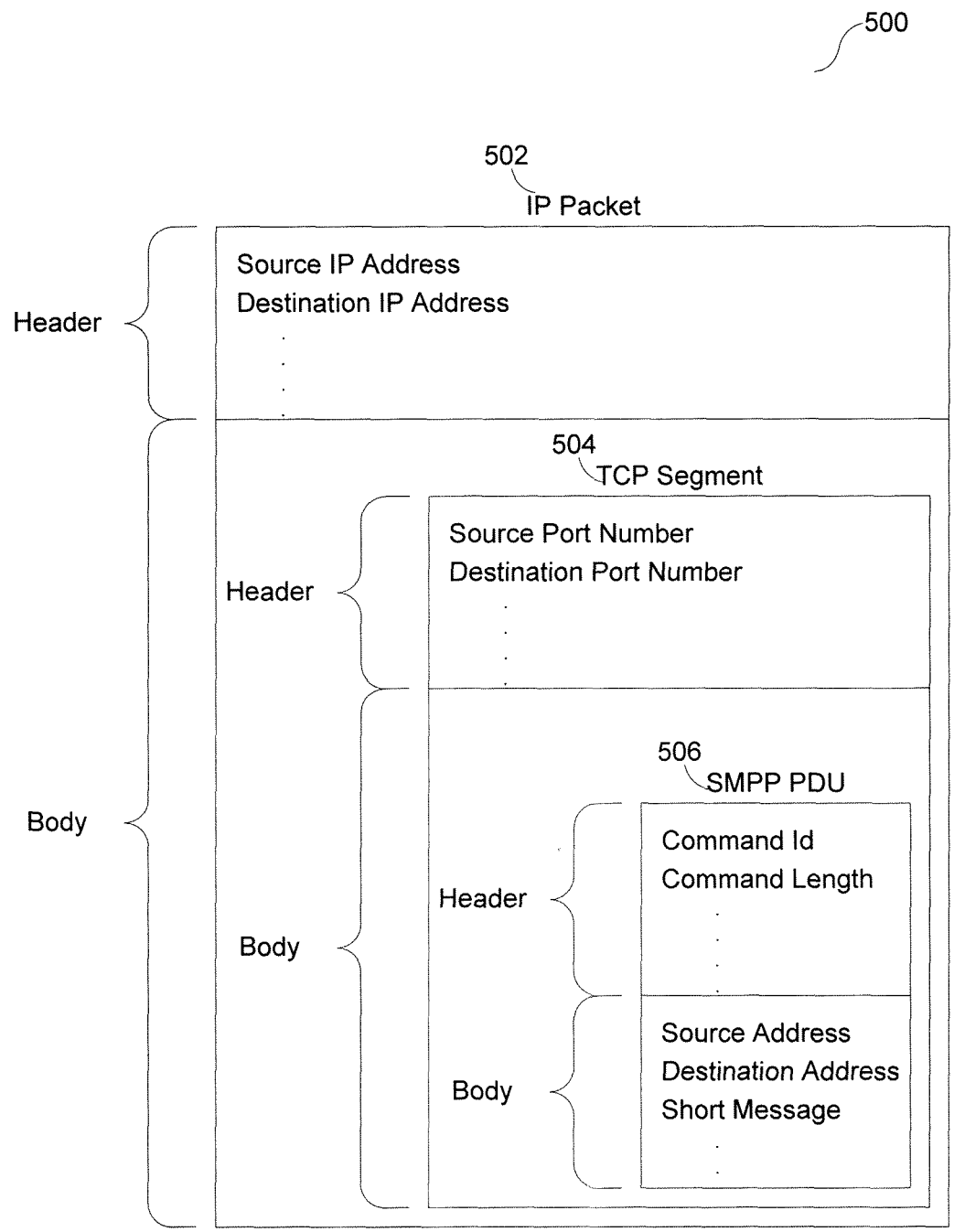
FIG. 5 illustrates aspects of an exemplary incoming SMS message received via an IP-based protocol.

For purposes of illustration, within an SMS context a MICV may support the receipt and dispatch of information through possibly inter alia Short Message Peer-to-Peer (SMPP) via Transmission Control Protocol (TCP)/IP and Mobile Application Part (MAP) via SS7. Under such a context:

1) FIG. 5 and reference numeral 500 depict an exemplary incoming SMS message received via for example SMPP with for example the data elements associated with the SMS message encapsulated within a SMPP Protocol Data Unit (PDU 506) encapsulated within a TCP Segment 504 encapsulated within an IP Packet 502.

Figure 6:
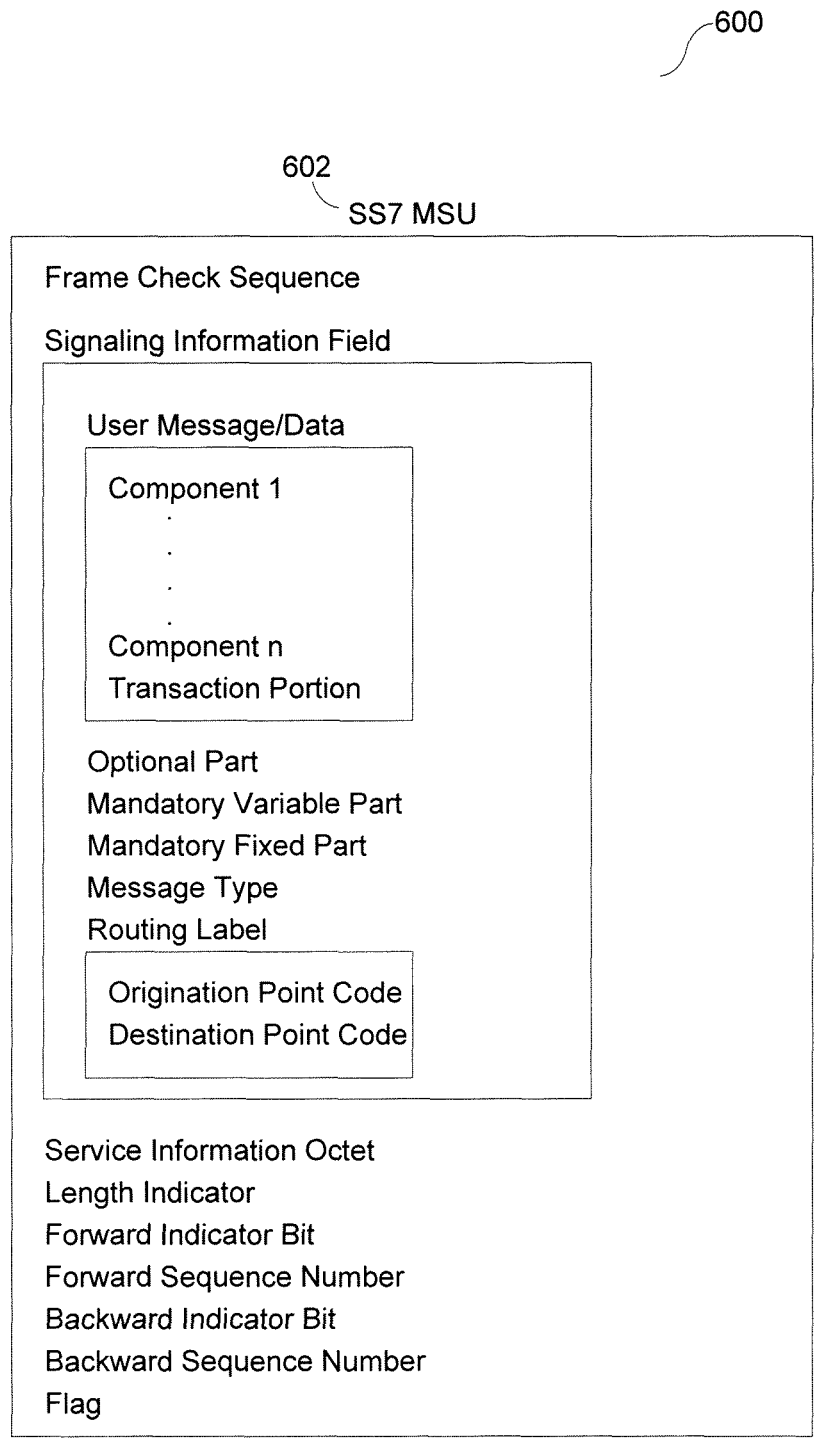
FIG. 6 illustrates aspects of an exemplary incoming SMS message received via Signaling System Number 7 (SS7).

2) FIG. 6 and reference numeral 600 depict an exemplary incoming SMS message received via for example MAP with for example the data elements associated with the SMS message encapsulated within a Message Signal Unit (MSU 602)

Figure 7:
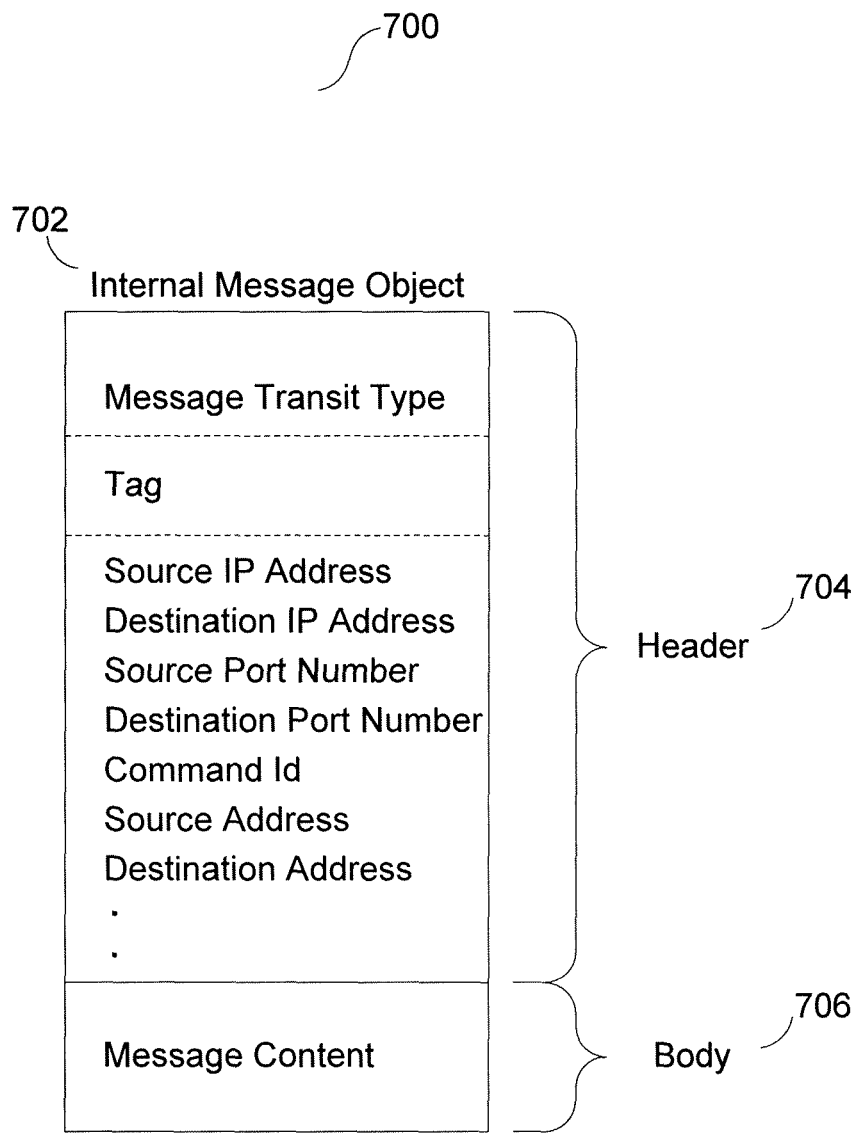
FIG. 7 illustrates aspects of a hypothetical Internal Message Object (IMO) that is possible in connection with an SMS message received via an IP-based protocol.
Figure 8:
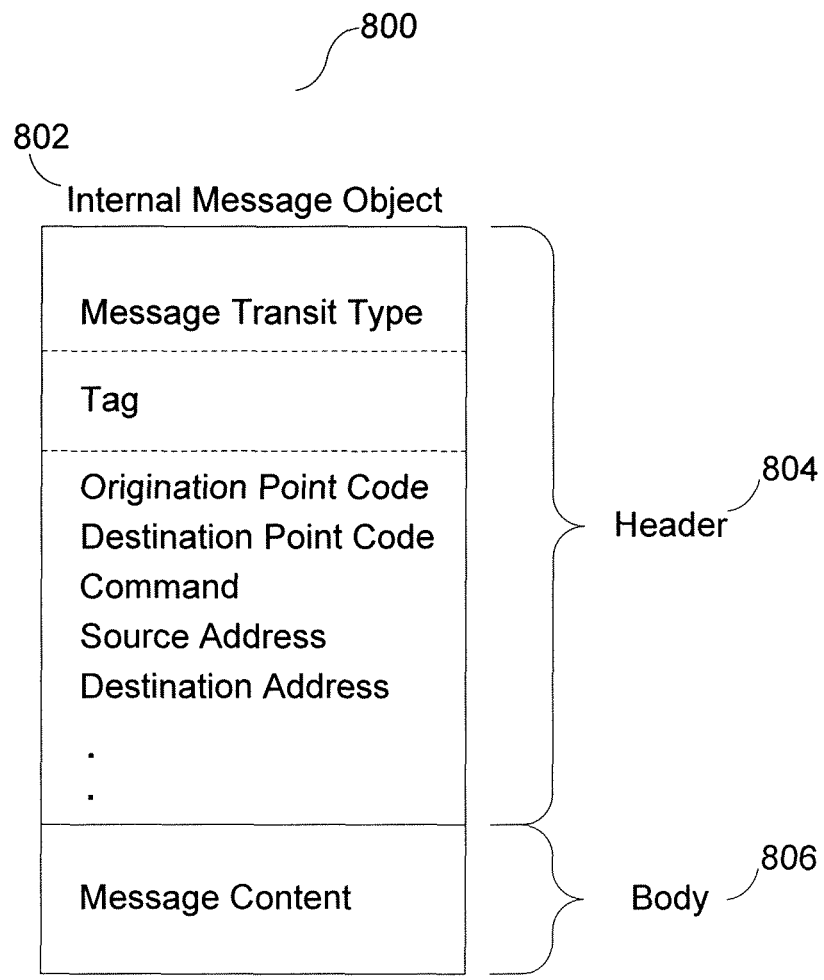
FIG. 8 illustrates aspects of a hypothetical IMO that is possible in connection with an SMS message received via SS7.
Figure 9:
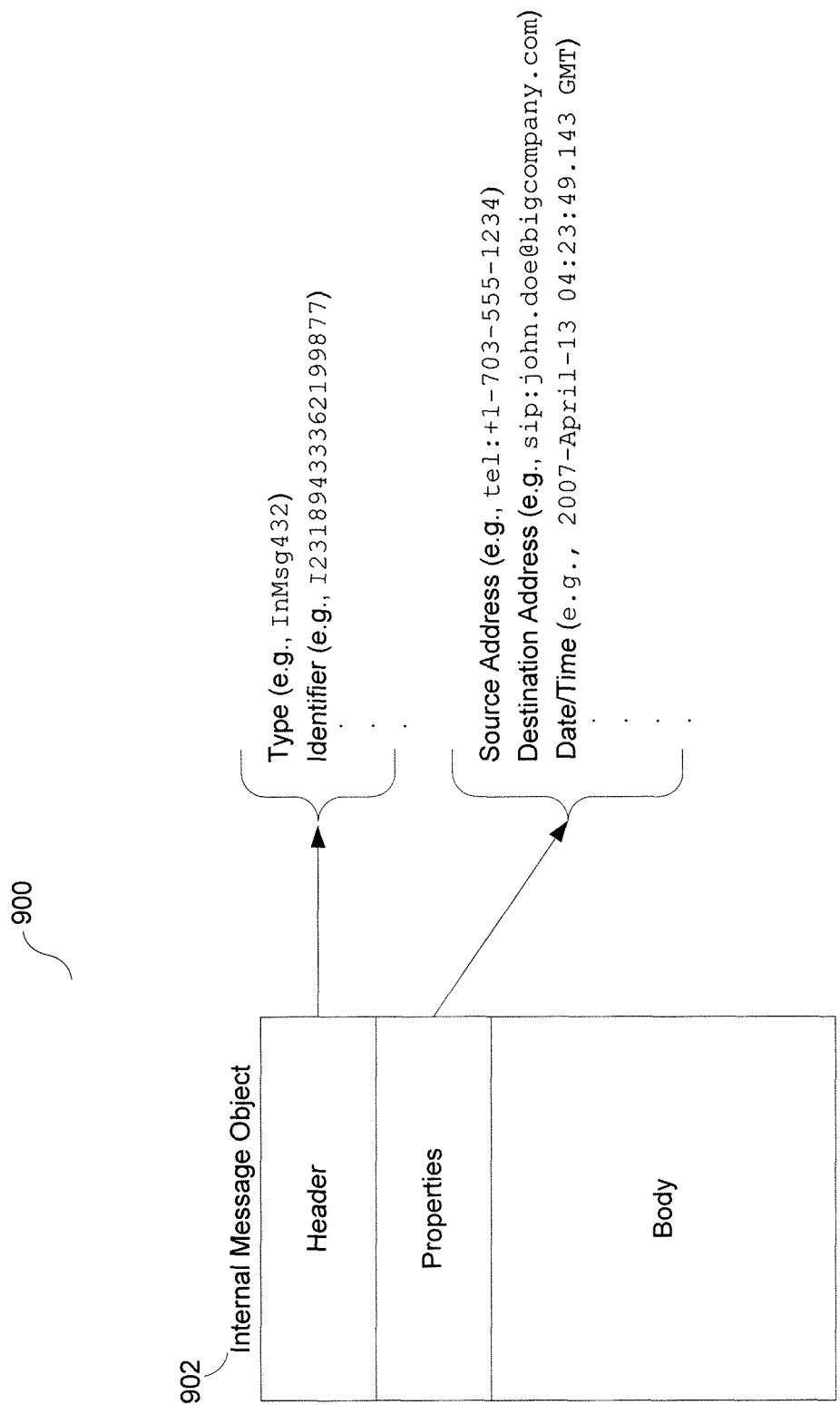
FIG. 9 illustrates aspects of a hypothetical IMO that is possible under aspects of the present invention.

3) FIG. 7 and reference numeral 700 depict a hypothetical IMO 702 that is possible in support of an SMS message received via for example SMPP, and 4) FIG. 8 and reference numeral 800 depict a hypothetical IMO 802 that is possible in support of an SMS message received via for example MAP.

It will be readily apparent to one of ordinary skill in the art that numerous alternative arrangements, in connection with for example different contexts (such as inter alia MMS, VoIP, a voice call, signaling data, command-and-control data, software application data, etc.) and different communication protocols, are easily possible.

For simplicity of exposition the balance of the present discussion will consider SMS messages. However, it will be readily apparent to one of ordinary skill in the relevant art that, as described above, the more general unit of information—a quanta of data—is equally applicable.

Figure 10:
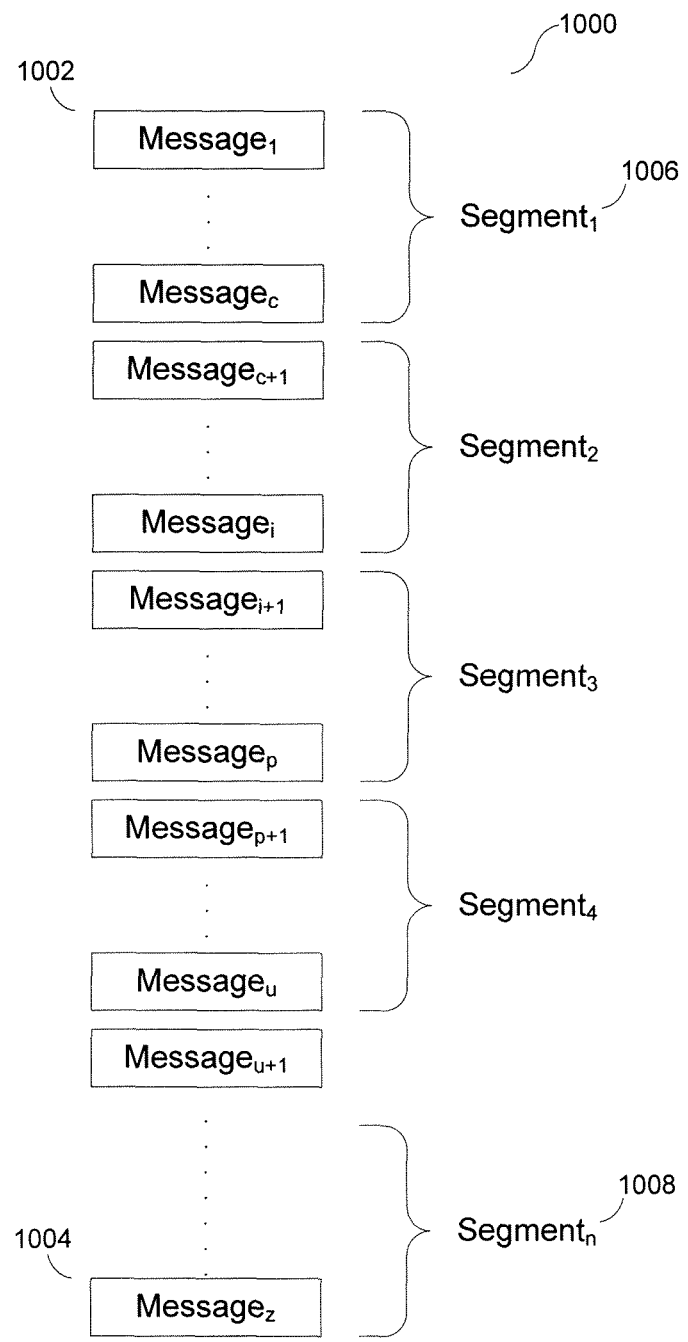
FIG. 10 depicts one way in which a hypothetical pool of messages may be divided in to a series of segments.

Consider a pool of SMS messages (Message$_1$ 1002→Message$_z$ 1004, see FIG. 10 and reference numeral 1000) that has arisen from for example a disruption (e.g., from a service interruption, from a system outage, etc.) in a messaging ecosystem, a burst of messages (e.g., in response to a tele-voting initiative, from a mass broadcast of alert or information messages in response to a news item or an emergency situation), etc.

Figure 13:
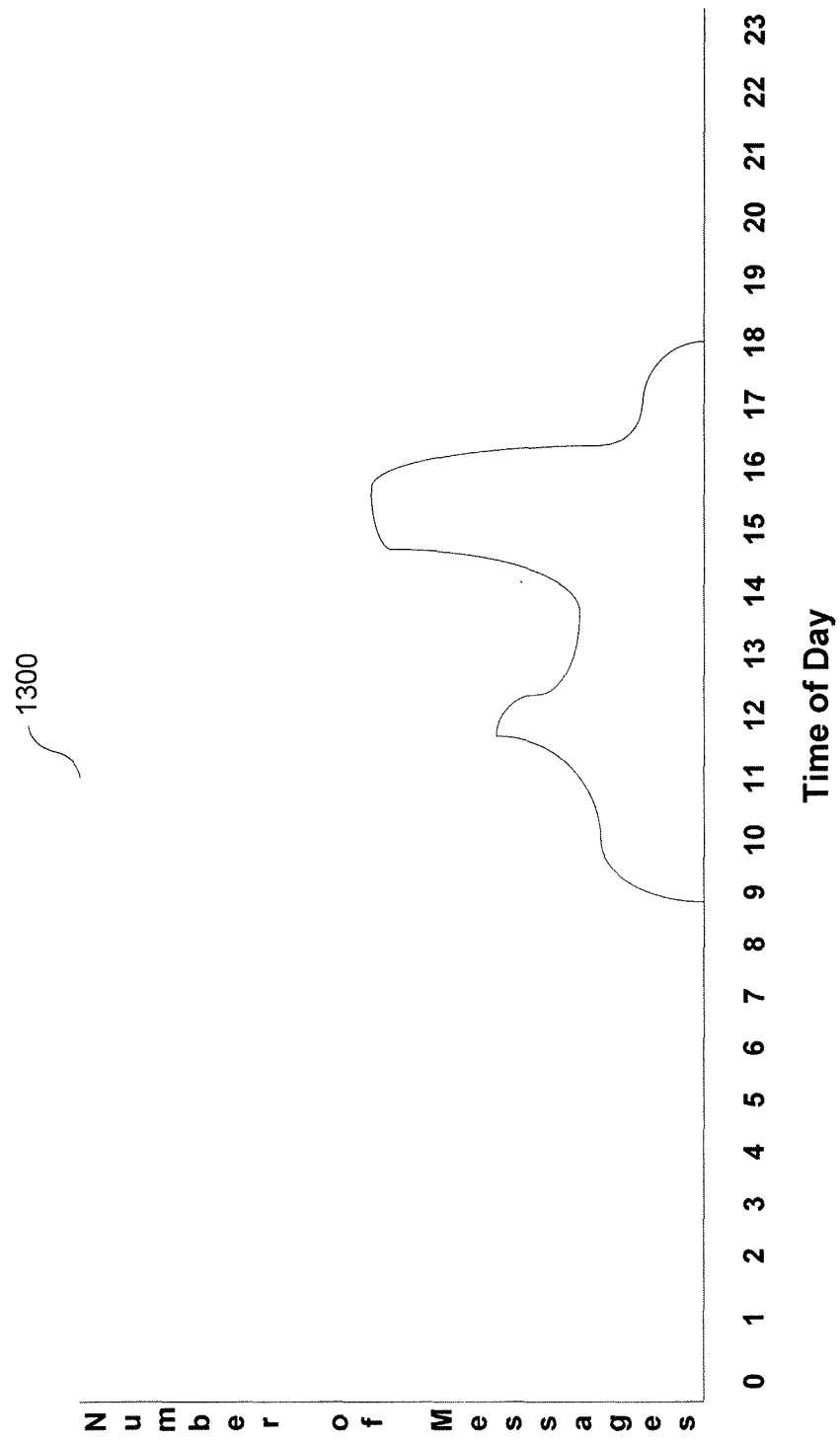
FIG. 13 illustrates a hypothetical message delivery window by hour of a day.

Any number of constraints, etc. may need to be considered as the messages in the pool are processed. As just one example, various temporal factors (e.g., the day of the week, the time of the day, etc.) may contribute to define one or more 'windows.' Within such a window (i.e., when a window is open) a message may be sent. Outside of such a window (i.e., when a window is closed) a message may need to be held, and not sent, until a sufficient amount of time passes so that a window (re)opens. FIG. 13 and reference numeral 1300 depict a hypothetical window that opens at 0900 (at/after which messages may be sent) and that closes at 1800 (at/after which messages may not be sent). Note that for simplicity of exposition no specific time reference point—e.g., GMT, a local time zone, etc.—is specified for FIG. 13.

It will be readily apparent to one of ordinary skill in the art that numerous alternative window arrangements are easily possible including inter alia the definition of multiple (possibly discrete, possibly overlapping) windows during a given 24-hour period, the definition of one or more quiet periods within a window (during which messages may not be sent), the association of a maximum message processing/transmission/etc. count to a particular period (e.g., one minute, three minutes, five minutes, 15 minutes, one hour, etc.) within a window, etc.

A pool of messages (e.g., Message$_1$ 1002→Message$_z$ 1004, see FIG. 10 and reference numeral 1000) may be divided into some number of segments (Segment$_1$ 1006→Segment$_n$ 1008) through among other things (a) a range of parameters, configuration values, settings, etc. and (b) any combination of one or more means including inter alia:

1) Uniform Means. For example, given inter alia a specified number of segments a pool of messages may be evenly divided across the segments. As illustrated by FIG. 11a and reference numeral 1100 a pool of 1740 messages may be divided into four segments with each segment containing 435 messages and as illustrated by FIG. 11b and reference numeral 1102 the same pool of 1740 messages may be divided into six segments with each segment containing 290 messages.

2) Random Means. For example, given inter alia a specified number of segments, along with perhaps other constraints (such as for example segment size maximums and/or minimums, etc.), a pool of messages may be randomly divided across the segments. As illustrated by FIG. 12a and reference numeral 1200 a pool of 1220 messages may be divided into four segments with each segment containing a different number of messages and as illustrated by FIG. 12b and reference numeral 1202 the same pool of 1220 messages may be divided into six segments with each segment containing a different number of messages 3) Algorithmic Means. For example, given inter alia a specified number of segments, an algorithm or formula (as supplied for example by a user, by an intermediary, by a WC, etc.), along with perhaps other constraints (such as for example segment size maximums and/or minimums, etc.) a pool of messages may be algorithmically divided across the segments.

The above identified means are illustrative only and it will be readily apparent to one of ordinary skill in the relevant art that numerous other means are easily possible.

Various of the parameters, configuration values, settings, etc. and/or the means (uniform, random, etc.) that were described above may be implemented through FIG. 4's WorkFlow component (WorkFlow$_1$ 406→WorkFlow$_c$ 416 in the diagram).

Figure 14:
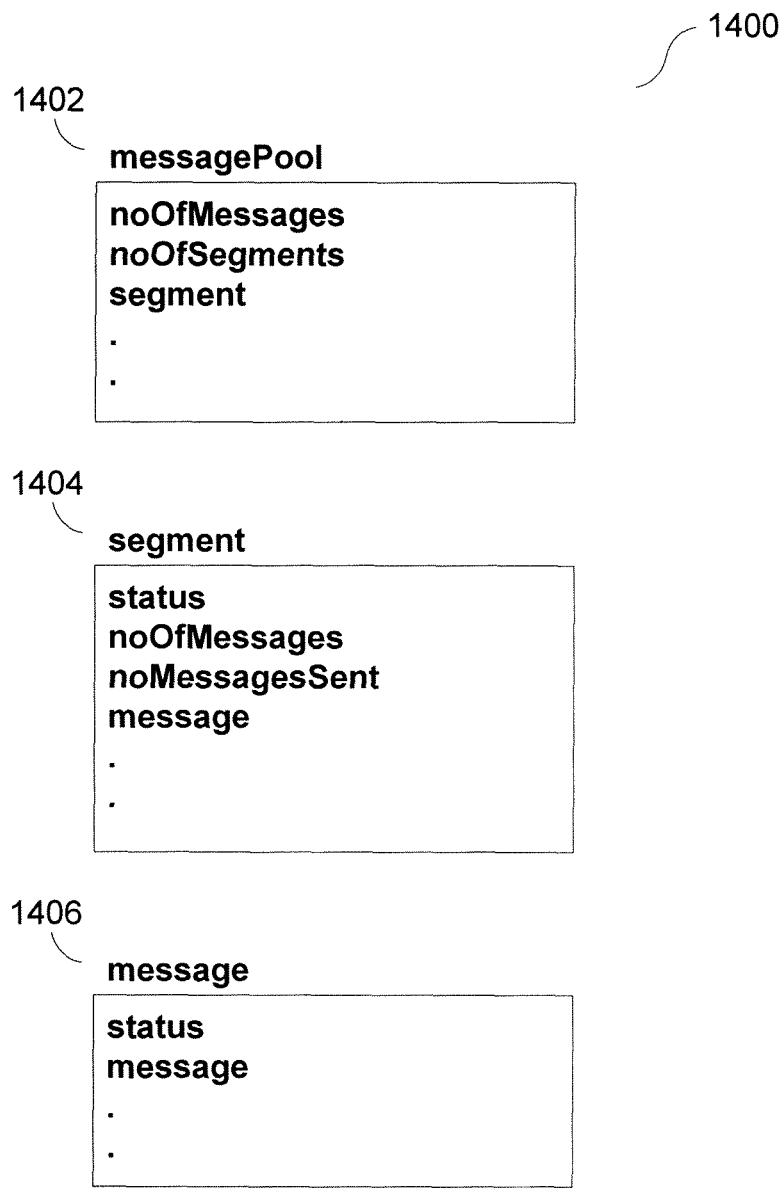
FIG. 14 depicts several exemplary data structures.

FIG. 14 and reference numeral 1400 depict three simple hypothetical data structures that might be used to support inter alia the division of a pool of messages into some number of segments:

1) A messagePool 1402 that comprises inter alia (a) the total number of messages in the pool (noOfMessages), (b) the number of segments into which the pool has been divided (noOfSegments), and (c) the segments themselves (segment).

2) A segment 1404 that comprises inter alia (a) an indicator of the status of the segment (perhaps for example CLOSED, WORKING, WORKED, or DONE), (b) the number of messages in the segment (noOfMessages), (c) the number of messages in the segment that have been sent (noOfMessagesSent), and (d) the messages themselves (message).

3) A message 1406 that comprises inter alia (a) an indicator of the status of the message (perhaps for example UNSENT or SENT) and (b) the message itself (message).

FIG. 15 and reference numeral 1500 illustrate one simple way in which a pool of messages, that has been divided into some number of segments, may be processed. In brief, a ProcessPool function 1502 may:

1) Perform any initialization activities.

2) Iterate or step through each of the segments 1→noOfSegments.

3) For a segment, send each message in the segment 1→noOfMessages.

4) Pause some configurable amount of time after each message is sent.

5) Pause some configurable amount of time after each segment is processed.

6) Perform any cleanup activities.

The sending of a message (see Step 3 above) may leverage inter alia aspects of the architecture (e.g., queues, gateways, etc. as depicted in FIGS. 3 and 4) and the constructs (e.g., an IMO) that were described above.

The ProcessPool function may be enhanced, extended, etc. through any number of means including inter alia optionally pausing after a message is sent, waiting for a positive or negative acknowledgement, receipt, etc., and then acting appropriately (e.g., continuing on with processing after a positive indicator is received); implementing a message send retry mechanism (to inter alia support the case when a negative acknowledgement, receipt, etc. is received); processing the message pool segments in some alternate order (as opposed to the indicated order 1→noOfSegments); processing the messages in a segment in some alternate order (as opposed to the indicated order 1→noOfMessages); etc.

Aspects of the ProcessPool function may among other things be implemented through FIG. 4's WorkFlow component (WorkFlow$_1$ 406→WorkFlow$_c$ 416 in the diagram).

FIGS. 16a→16d and reference numerals 1600/1602/1604/1606/1608 illustrate an alternative way in which a pool of messages, that has been divided into some number of segments, may be processed. In brief, a ProcessPool function 1602 may:

1) Perform any initialization activities.

2) Iterate or step through each of the segments 1→noOfSegments and (a) mark each segment as unprocessed (CLOSED with no messages sent) and (b) mark each message in the segment as unsent.

3) Enter into a loop.

4) If the window is closed then halt any child (segment processing) threads and loop (to wait until the window opens).

5) If the window is open then locate an unprocessed segment (i.e., the status of the segment is CLOSED) and if possible launch a child (segment processing) thread for the segment.

6) If a segment has been fully worked (by a child [segment processing] thread) then mark the segment as being DONE.

7) If a segment that is currently being worked (i.e., the status of the segment is WORKING) has reached a specified 'number of messages sent' threshold (e.g., perhaps 80%, perhaps 50%, etc.) then another segment may be opened for processing.

8) If all of the segments have been fully processed (i.e., every segment has a status of DONE) then exit the loop.

9) Perform any cleanup activities.

A ProcessSegment function may:

1) For the segment, send each message in the segment 1→noOfMessages.

2) Pause some configurable amount of time after each message is sent.

3) Pause some configurable amount of time after the segment is processed.

The sending of a message (see Step 1 above) may leverage inter alia aspects of the architecture (e.g., queues, gateways, etc. as depicted in FIGS. 3 and 4) and the constructs (e.g., an IMO) that were described above.

The ProcessPool function and/or the ProcessSegment function may be enhanced, extended, etc. through any number of means including inter alia optionally pausing after a message is sent, waiting for a positive or negative acknowledgement, receipt, etc., and then acting appropriately (e.g., continuing on with processing after a positive indicator is received); implementing a message send retry mechanism (to inter alia support the case when a negative acknowledgement, receipt, etc. is received); processing the messages in a segment in some alternate order (as opposed to the indicated order 1→noOfMessages); breaking the ProcessPool function into some number of smaller functions and optionally tying various of those smaller functions to child worker threads; etc.

Aspects of the ProcessPool function and/or the ProcessSegment function may among other things be implemented through FIG. 4's WorkFlow component (WorkFlow$_1$ 406→WorkFlow$_c$ 416 in the diagram).

As noted above (in connection with both FIG. 15 and FIGS. 16a→16d), after a message is sent it is possible to optionally pause, wait for a positive or negative acknowledgement, receipt, etc., and then act appropriately (e.g., continue on with processing after a positive indicator is received). Such an approach effectively makes the message transmission self-moderating or self-regulating—i.e., as fast or as slow as a positive acknowledgement, receipt, etc. is received the next message may be processed. If for example a particular WC (to whom a MICV is sending a message) can accept messages quickly then messages will be sent quickly; if the WC can only accept messages slowly then messages will be sent slowly.

It will be readily apparent to one of ordinary skill in the relevant art that numerous other ProcessPool functions (beyond those that were illustrated by FIG. 15 and FIGS. 16a→16d) are easily possible. For example, a range of Quality of Service (QoS) metrics, targets, etc., for which in some cases a financial amount may be associated, may be included as additional processing constraints.

In the discussion above a simple model of Message Pool→Segments→Messages was employed. That simple model was employed for ease of exposition and was inter alia in no way intended to be exhaustive or limiting. It will be readily apparent to one of ordinary skill in the relevant art that numerous other flat, hierarchical, etc. models of any size, depth, etc. (such as for example Message Pool Segments→Units→Messages, Message Pool→Blocks→Groups→Parts→Messages, etc.) may be employed.

In the discussion above reference was made on numerous occasions, for purposes of illustration, to SMS, MMS, etc. message traffic. Such references were not intended to be exhaustive or to limit the invention to the specific forms disclosed. It will be readily apparent to one of ordinary skill in the relevant art that numerous other quanta of data including inter alia IMS message, an E-Mail message, a VoIP data stream, a video data stream [e.g., a movie, a video conference call, etc.], a voice telephone call, signaling and other command-and-control data, an audio data stream [e.g., a song, etc.], IM data, games and other software applications, pictures and other static images, data from software applications such as games, SIP-addressed artifacts, WAP-based exchanges, etc. are easily possible and, indeed, are fully within the scope of the present invention.

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention.

The following list defines acronyms as used in this disclosure.

| Acronym | Meaning |
| --- | --- |
| A2P | Application-to-Peer |
| API | Application Programming Interface |
| CD-ROM | Compact Disc Read-Only Memory |
| CP | Content Provider |
| DBMS | Database Management System |
| DRAM | Dynamic Random Access Memory |
| E-Mail | Electronic Mail |
| EPROM | Erasable Programmable Read-Only Memory |
| ETL | Extraction-Transformation-Load |
| GIS | Geographic Information System |
| IM | Instant Messaging |
| IMO | Internal Message Object |
| IMS | IP Multimedia Subsystem |
| IP | Internet Protocol |
| JMS | Java Message Service |

-continued

| Acronym | Meaning |
|---|---|
| MAP | Mobile Application Part |
| MEMS | Microelectromechanical Systems |
| MH | Message Highway |
| MICV | Messaging Inter-Carrier Vendor |
| MMS | Multimedia Message Service |
| MPE | Message Processing Engine |
| MS | Mobile Subscriber |
| MSU | Message Signal Unit |
| ODBMS | Object Database Management System |
| P2P | Peer-to-Peer |
| PCMCIA | Personal Computer Memory Card International Association |
| PDA | Personal Digital Assistant |
| PDU | Protocol Data Unit |
| PROM | Programmable Read-Only Memory |
| QoS | Quality of Service |
| RAM | Random Access Memory |
| RDBMS | Relational Database Management System |
| RF | Radio Frequency |
| SIP | Session Initiation Protocol |
| SMPP | Short Message Peer-to-Peer |
| SMS | Short Message Service |
| SP | Service Provider |
| SS7 | Signaling System Seven |
| 3P | Third Party |
| TCP | Transmission Control Protocol |
| TDR | Transaction Detail Record |
| USSD | Unstructured Supplementary Service Data |
| VoIP | Voice Over IP |
| WAP | Wireless Application Protocol |
| WC | Wireless Carrier |
| WD | Wireless Device |
| WWW | World-Wide Web |

What is claimed is:

1. A server-based method for dynamic message throttling, the server-based method comprising:
   identifying, using a processor in communication with a memory, a message pool to be processed, the message pool comprising a plurality of messages stored in the memory;
   partitioning the message pool into a plurality of subdivisions; and
   performing a plurality of processing steps while a delivery window is open, including at least:
   (a) opening a first subdivision for processing, yielding an open subdivision,
   (b) selecting a message from the open subdivision, yielding a selected message,
   (c) performing one or more processing steps on the selected message,
   (d) dispatching through a gateway aspects of the selected message for subsequent delivery to a message recipient, and
   (e) pausing zero or more units of time,
   wherein the steps of (b) selecting a message from the open subdivision and (c) performing one or more processing steps on the selected message are based on whether a predetermined number of messages from the open subdivision have been sent, and when the predetermined number of messages from the open subdivision have been sent, opening a second subdivision and performing steps (b)-(d) on messages in the second subdivision.

2. The server-based method of claim 1 wherein the message is one of (a) a Short Message Service message, (b) a Multimedia Message Service message, (c) an Internet Protocol Multimedia Subsystem message, or (d) an Unstructured Supplementary Service Data-based message.

3. The server-based method of claim 1 wherein the partitioning step employs one of (a) a uniform means, (b) a random means, or (c) an algorithmic means.

4. The server-based method of claim 1 wherein the delivery window is open based on one or more of (a) a day of week, (b) a time of day, and (c) one or more quiet periods.

5. The server-based method of claim 1 wherein the unit of time is seconds.

6. The server-based method of claim 1 wherein the gateway employs one or both of (a) an Internet Protocol-based communication protocol or (b) Signaling System 7.

7. A processor-based system on a server configured for dynamic message throttling, the processor-based system comprising:
   a memory;
   a processor communicatively coupled to the memory;
   workflow modules, in the form of computer control logic stored in the memory, configured to perform, in combination with the processor communicatively coupled to the memory, a plurality of processing steps including at least:
   (a) identifying a message pool to be processed, the message pool comprising a plurality of messages,
   (b) partitioning the message pool into a plurality of subdivisions, and
   (c) performing one or more processing steps while a delivery window is open, including at least:
   (i) opening a first subdivision for processing, yielding an open subdivision,
   (ii) selecting a message from the open subdivision, yielding a selected message,
   (iii) performing a plurality of processing steps on the selected message, and
   (iv) pausing zero or more units of time;
   wherein the steps of (ii) selecting a message from the open subdivision and (iii) performing a plurality of processing steps on the selected message are based on whether a predetermined number of messages from the open subdivision have been sent, and when the predetermined number of messages from the open subdivision have been sent, opening a second subdivision and performing steps (ii)-(iii) on messages in the second subdivision;
   an interface configured to dispatch aspects of the selected message for subsequent delivery to a message recipient;
   a repository configured to preserve aspects of the results of the plurality of processing steps; and
   an administrator.

8. The processor-based system of claim 7 wherein the message is one of (a) a Short Message Service message, (b) a Multimedia Message Service message, (c) an Internet Protocol Multimedia Subsystem message, or (d) an Unstructured Supplementary Service Data-based message.

9. The processor-based system of claim 7 wherein the partitioning step employs one of (a) a uniform means, (b) a random means, or (c) an algorithmic means.

10. The processor-based system of claim 7 wherein the delivery window is open based on one or more of (a) a day of week, (b) a time of day, and (c) one or more quiet periods.

11. The processor-based system of claim 7 wherein the unit of time is seconds.

12. The processor-based system of claim 7 wherein the interface employs one or both of (a) an Internet Protocol-based communication protocol or (b) Signaling System 7.

* * * * *